(12) United States Patent
Knott

(10) Patent No.: US 7,678,189 B2
(45) Date of Patent: Mar. 16, 2010

(54) FOAMING PLASTER

(76) Inventor: Edgar Donald Knott, 7 Boronia Avenue, Nedlands, W.A. (AU) 6009

(*) Notice: Subject to any disclaimer, the term of this patent is extended or adjusted under 35 U.S.C. 154(b) by 510 days.

(21) Appl. No.: 11/722,098

(22) PCT Filed: Dec. 16, 2005

(86) PCT No.: PCT/AU2005/001908

§ 371 (c)(1),
(2), (4) Date: Jun. 19, 2007

(87) PCT Pub. No.: WO2006/072126

PCT Pub. Date: Jul. 13, 2006

(65) Prior Publication Data

US 2009/0324931 A1    Dec. 31, 2009

(30) Foreign Application Priority Data

Jan. 7, 2005    (AU) .............................. 2005900053

(51) Int. Cl.
*C04B 11/00*    (2006.01)

(52) U.S. Cl. ................ 106/680; 106/672; 106/772; 428/703; 52/415; 52/416; 52/443; 52/506.01

(58) Field of Classification Search ............... 106/672, 106/680, 772; 428/703; 52/515, 416, 443, 52/506.01

See application file for complete search history.

(56) References Cited

U.S. PATENT DOCUMENTS 6,162,839 A    12/2000    Klauck et al.

FOREIGN PATENT DOCUMENTS

| AU | 1991/88188 A | 6/1992 |
|----|--------------|--------|
| JP | 53018626 | 2/1978 |
| SU | 1010034 A | 4/1983 |
| WO | 00/06518 A | 2/2000 |

*Primary Examiner*—Paul Marcantoni
(74) *Attorney, Agent, or Firm*—David A. Guerra

(57) ABSTRACT

A method of producing a foamed plaster comprises the following steps: (a) mixing plaster of Paris and calcium carbonate; (b) supplying water, and (c) adding phosphoric acid. The phosphoric acid reacts with the calcium carbonate to release gaseous carbon dioxide. It also reacts with any steel present to form an insoluble iron phosphate coating.

20 Claims, No Drawings

FOAMING PLASTER

FIELD OF THE INVENTION

The present invention relates to foaming plaster and a method of manufacture thereof.

SUMMARY OF THE INVENTION

In accordance with one aspect of the present invention there is provided a method of producing a foamed plaster, the method characterised by comprising the steps of:
(a) mixing plaster of Paris and calcium carbonate, the calcium carbonate being between 2% and 12% by weight of the plaster of Paris;
(b) supplying water, and
(c) adding phosphoric acid, the phosphoric acid reacting with the calcium carbonate to release gaseous carbon dioxide, and the water providing water of hydration to the plaster of Paris to form gypsum.

DESCRIPTION OF PREFERRED EMBODIMENTS

In a preferred embodiment of the invention a building panel is formed using the following method.

A suitable calcium carbonate containing material is ground to a size of under 50 micron. Suitable calcium carbonate containing materials include limestone, marble, lime sands and coral sands. Preferably the material is predominantly calcium carbonate, with low levels of soluble salts of sodium and magnesium. The ground calcium carbonate is added to powdered plaster of Paris in such quantity that the resulting plaster of Paris and calcium carbonate mixture contains about 6% calcium carbonate by weight.

Surface sheeting materials, such as steel, aluminium or fibreglass sheets, are held in frames so as to create a cavity therebetween. The ends of the cavity are sealed by known means.

The inner surfaces of the sheeting materials are preferably treated with a bonding agent such as an epoxy primer with glass or other fibre to increase the bond between the sheeting and the plaster.

The combined plaster of Paris and calcium carbonate mixture is then combined with 4% w/v phosphoric acid solution in a ratio of about two parts by volume plaster of Paris and calcium carbonate mixture to about one part by volume phosphoric acid solution. A frothing agent may also be added. The resulting suspension is then sprayed or poured into the cavity.

In an alternative embodiment, water is added to the mixture in the ratio of about two parts by volume plaster of Paris and calcium carbonate mixture to about one part by volume water. The resulting suspension is then sprayed into the cavity, using an appropriately designed spray head, along with concentrated phosphoric acid. Preferably, the acid has a concentration of about 81% to 85% w/v.

In both embodiments, the water present adds water of hydration to the plaster of Paris, thus forming gypsum. At the same time, the phosphoric acid reacts with the calcium carbonate in the limestone according the to the equation $$3CaCO_3 + 2H_3PO_4 \rightarrow Ca_3(PO_4)_2 + 3H_2O + 3CO_2 \uparrow$$

in order to liberate carbon dioxide gas. The gypsum sets around the bubbles, forming a foamed plaster.

It will be appreciated that the above proportions allow for a surplus of calcium carbonate so that when the reaction above is completed no free acid remains. The hard, foamed plaster produced is comprised predominantly of gypsum together with small amounts of calcium phosphate and remaining calcium carbonate. It will be appreciated that calcium phosphate and calcium carbonate are relatively insoluble, thus allowing for a long life for the foamed plaster.

One advantage of the present invention is that the phosphoric acid used during formation of the foamed plaster forms an insoluble iron phosphate coating on any steel sheeting or reinforcing used in connection with the foamed plaster. It will be appreciated that the use of other acids may cause degradation of steel in contact with the foamed plaster.

A further advantage of this method is that it is anticipated that over time the calcium phosphate will react with fluoride and/or chloride in the resultant foamed plaster to form apatite, making the structure stronger, and with potentially soluble fluoride and chloride converted to relatively insoluble apatite.

It will be appreciated that the method described hereinabove may be varied by the addition of stabilising or strengthening elements to the plaster mix, such as cement or other pozzolanic materials or organic polymers, epoxies and the like. It will also be appreciated that the amount of foaming, and the size of the gaseous bubbles, may be controlled by careful selection of the sizing and amount of calcium carbonate, phosphoric acid and frothing agents used in the above process. It is anticipated that a quantity of calcium carbonate between 2% and 12% by weight of the plaster of Paris will yield a useful result.

In another embodiment of the invention, foamed plaster blocks may be formed by combining the equivalent of 8% by weight calcium carbonate with plaster of Paris. This mixture is then added in a ratio of about two to one by volume with about 5% w/v phosphoric acid, and the resulting the mix sprayed into a box mould. The reaction proceeds as above. When the foamed plaster blocks are formed they can then be cut to a required size.

It will be appreciated that foamed plaster made according to the present invention is particularly useful in acting as a fire retardant, and in insulating exposed steel beams on columns.

Modifications and variations as would be apparent to a skilled addressee are deemed to be within the scope of the present invention.

The invention claimed is:
1. A method of producing a foamed plaster, said method comprising the steps of:
   (a) mixing plaster of Paris and calcium carbonate, said calcium carbonate being between 2% and 12% by weight of said plaster of Paris;
   (b) supplying water; and
   (c) adding phosphoric acid, said phosphoric acid reacting with said calcium carbonate to release gaseous carbon dioxide bubbles, and said water providing water of hydration to said plaster of Paris to form gypsum that sets around said carbon dioxide bubbles thereby forming said foamed plaster.
2. The method as set forth in claim 1, wherein said calcium carbonate is about 6% by weight of said plaster of Paris.
3. The method as set forth in claim 2, wherein said calcium carbonate is contained within a calcium carbonate containing material.
4. The method as set forth in claim 3, wherein said calcium carbonate containing material is selected from the group consisting of limestone, marble, lime sands, and coral sands.
5. The method as set forth in claim 4, wherein said calcium carbonate containing material is ground to a size of under 50 micron.

6. The method as set forth in claim 5, wherein said water and phosphoric acid are supplied together as dilute phosphoric acid solution.

7. The method as set forth in claim 6, wherein said dilute phosphoric acid solution has a concentration of about 6% w/v.

8. The method as set forth in claim 6, wherein said dilute phosphoric acid solution is supplied in a ratio of about two parts by volume plaster of Paris and calcium carbonate solution to about one part by volume dilute phosphoric acid solution.

9. The method as set forth in claim 5, wherein said water is combined with said plaster of Paris and calcium carbonate before said phosphoric acid is added.

10. The method as set forth in claim 9, wherein said water is supplied in a ratio of about two parts by volume plaster of Paris and calcium carbonate solution to about one part by volume water.

11. The method as set forth in claim 10, wherein said added phosphoric acid has a concentration of about 81% to 85% w/v.

12. The method as set forth in claim 11 further comprising the step of spraying said combined water and plaster of Paris mixture into a cavity together with a phosphoric acid spray, said cavity comprising steel members.

13. The method as set forth in claim 12, wherein said cavity is formed by holding surface steel sheets in spaced arrangement so as to form a building panel cavity therebetween, and wherein inner surfaces of said steel sheets are treated with a bonding agent and fibers to increase the bond between said sheeting materials and said foamed plaster.

14. The method as set forth in claim 1 further comprising the step of spraying said foamed plaster into a box mould.

15. The method as set forth in claim 14, wherein said calcium carbonate is about 8% by weight of said plaster of Paris.

16. The method as set forth in claim 15, wherein said water and phosphoric acid are supplied together as an about 5% w/v phosphoric acid solution.

17. A foamed plaster building panel comprising:
a plurality of surface sheeting materials having an inner surface featuring a bonding agent and fibers, said surface sheeting materials being configured to form a building panel; and
a foamed plaster core adapted to bond with said bonding agent and fibers of said surface sheeting materials, said foamed plaster core being plaster of Paris, calcium carbonate between 2% and 12% by weight of said plaster of Paris, water in a ratio of about two parts by volume plaster of Paris and calcium carbonate solution to about one part by volume water, and phosphoric acid at a concentration of about 81% to 85% w/v.

18. The method as set forth in claim 17, wherein said foamed plaster core further comprising a frothing agent.

19. The method as set forth in claim 17, wherein said building panel is a block.

20. A foamed plaster building panel comprising:
a foamed plaster block comprising plaster of Paris, calcium carbonate about 8% by weight of said plaster of Paris, and about a 5% phosphoric acid solution having water and phosphoric acid.

* * * * *